United States Patent [19]
Lai

[11] Patent Number: 5,275,150
[45] Date of Patent: Jan. 4, 1994

[54] SOLAR COLLECTOR

[76] Inventor: Herman Lai, No. 25, Ta Chin St., Taichung, Taiwan

[21] Appl. No.: 935,272

[22] Filed: Aug. 26, 1992

[51] Int. Cl.$^5$ ............................................. F23J 3/02
[52] U.S. Cl. .................................... 126/692; 126/670; 126/704; 126/680; 126/569
[58] Field of Search ............... 126/648, 706, 908, 904, 126/661, 670, 680, 684, 692, 693, 695, 694, 688, 689–691; 126/704; 359/852, 853

[56] References Cited
U.S. PATENT DOCUMENTS

| | | | |
|---|---|---|---|
| 1,258,405 | 3/1918 | Harrison | 126/692 X |
| 4,059,094 | 11/1977 | Barrio de Mendoza | 126/704 X |
| 4,088,120 | 5/1978 | Anderson | 126/573 |
| 4,281,642 | 8/1981 | Steinberg | 126/704 X |
| 5,167,218 | 12/1992 | Deakin | 126/654 |

*Primary Examiner*—Larry Jones
*Attorney, Agent, or Firm*—Bacon & Thomas

[57] ABSTRACT

A solar collector including a plate disposed in a bottom portion of a housing, one or more tubes disposed above the plate for accommodating water, and one or more reflecting surfaces formed in the upper portion of the plate for reflecting lights in order to heat the water contained in the tubes.

11 Claims, 2 Drawing Sheets

SOLAR COLLECTOR

BACKGROUND OF THE INVENTION

1. Field of the Invention

The present invention relates to a solar collector.

2. Description of the Prior Art

A typical solar collector is shown in FIG. 3 and comprises a layer of heat insulating materials 60 disposed in the bottom portion of a housing 80, a sheet 90, which is preferably made of glass, disposed on top of the housing 80, a layer of tin foil 70 applied to the top of the materials 60, a plurality of brass tubes 40 disposed above the tin foil 70 and each including a heat collector plate 50 disposed thereon for collecting solar energy and for heating the water flowing through the tubes 40. The solar energy can not be suitably collected.

The present invention has arisen to mitigate and/or obviate the afore-described disadvantages of the conventional solar collectors.

SUMMARY OF THE INVENTION

The primary objective of the present invention is to provide a solar collector which has a high energy collecting rate.

In accordance with one aspect of the invention, there is provided a solar collector comprising a housing, a plate disposed in a bottom portion of the housing and including at least one reflecting surface formed in an upper portion thereof, and at least one tube disposed above the plate for accommodating heat conducting medium, whereby, light shining on the reflecting surface is reflected to the tube in order to heat the heat conducting medium.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
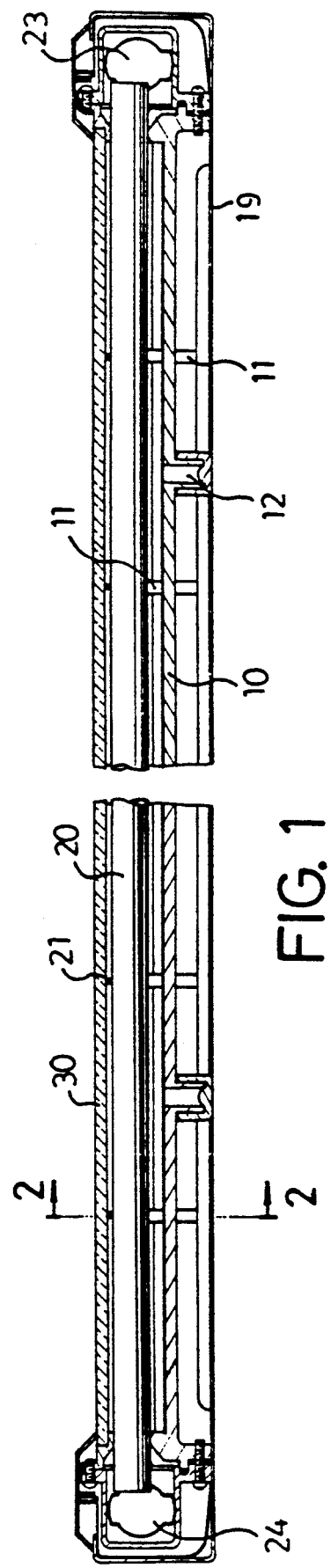
FIG. 1 is a cross sectional view of a solar collector in accordance with the present invention, taken along lines 1—1 of FIG. 2.
Figure 3:
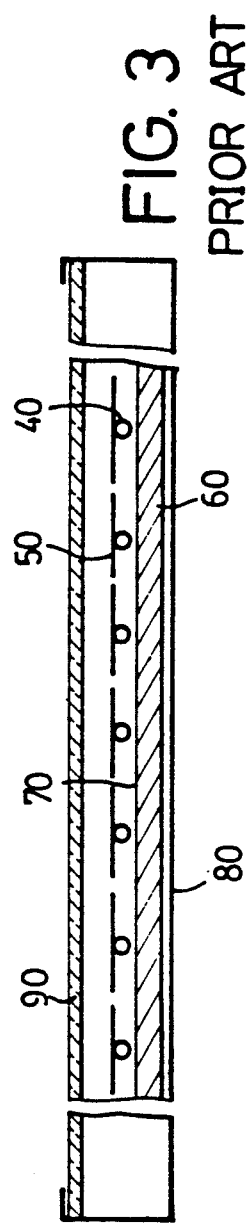
FIG. 3 is a partial cross sectional view of the typical solar collector.
Figure 2:
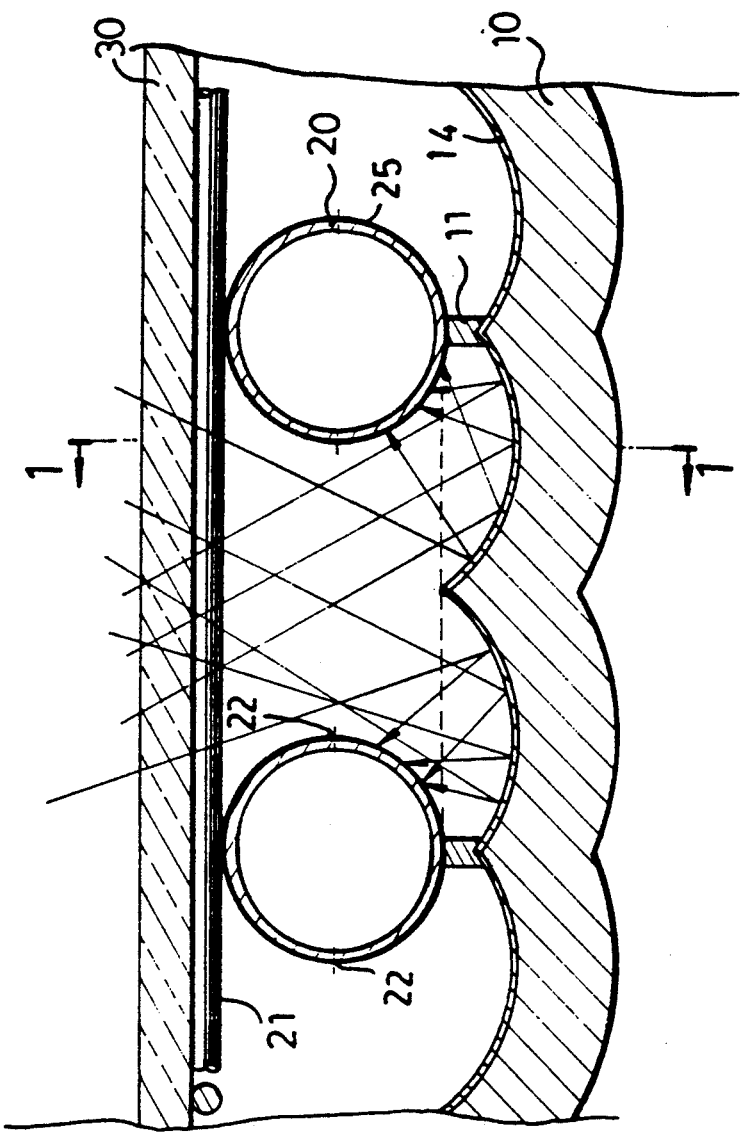
FIG. 2 is a cross sectional view taken along lines 2—2 of FIG. 1.

Referring to FIGS. 1 and 2, a solar collector in accordance with the present invention comprises generally a plate 10 disposed in the bottom portion of a housing 19, a plurality of tubes 20 disposed above the plate 10 and supported in place by posts 11, a mesh grid 21 disposed above the tubes 20 and a cover 30 disposed above the mesh grid 21 and preferably made of glass materials; an inlet pipe 23 and an outlet pipe 24 disposed in the housing 19 and communicated with the end portions of the tubes 20 respectively, such that water and the like may flow into the outlet pipe 24 via the inlet pipe 23 and the tubes 20.

As best shown in FIG. 2, the plate 10 is wave shaped including a plurality of concave surfaces formed in the upper portion thereof, each of the concave surfaces has a layer of silver 14 formed thereon by such as electroplating processes so as to form a reflective surface, it is preferable that two concave surfaces are formed between every two adjacent tubes 20, and one reflective surface provided on each side of each of the tubes 20, and the center of curvature of each of the concave surfaces is preferably located at the side portions 22 of the tubes 20, such that the light reflected by the reflective surfaces 14 may be concentrated on the tubes 20 and such that the water flowing through the tubes 20 can be heated in a fast speed.

It is preferable that the outer peripheral surfaces of the tubes 20 are electroplated with a layer of chrome coating 25 in order to facilitating the absorption of the heat from the light, in which the chrome coating 25 has a black color.

Referring again to FIG. 1, at least one opening 12 is provided for vacuuming the space of the housing 19 formed between the plate 10 and the cover 30, and the opening 12 is blocked after vacuuming operations such that the space formed between the plate 10 and the cover 30 is a vacuum space, whereby, no media for conducting heat is existed in the space, such that no heat loss of the water will be occurred, in addition, the plate 10 and the cover 30 for forming the space will not be heated such that the plate 10 and the cover 30 need not be made of heat resistant materials. The mesh grid 21 is provided to support the cover 30 when the space is vacuumed.

Accordingly, the solar energy can be effectively collected by the solar collector in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solar collector comprising: a housing; a plate disposed in a bottom portion of said housing and having a plurality of concave and reflecting surfaces formed in an upper portion thereof such that adjacent concave and reflecting surfaces define a cusp therebetween; a tube disposed above and extending along said cusp for accommodating a heat conducting medium therein; and, support means attached to the plate at the cusp to support said tube on said plate, whereby, light shining on said concave and reflecting surfaces is reflected onto said tube in order to heat said heat conducting medium.

2. A solar collector according to claim 1, wherein said concave and reflecting surfaces include a layer of silver applied thereon for reflecting said light.

3. A solar collector according to claim 1 further comprising a cover engaged on a top portion of aid housing and arranged such that a space is defined between said plate and said cover which space comprises a vacuum space.

4. A solar collector according to claim 3, wherein said housing further comprises a mesh grid disposed between said tubes and said cover for supporting said cover.

5. A solar collector according to claim 3, wherein said housing defines at least one opening therein for drawing a vacuum in said space.

6. A solar collector according to claim 1, further comprising a chrome coating applied to an outer peripheral surface of each of said tubes for facilitating heat absorption.

7. A solar collector comprising: a housing; a plate disposed in a bottom portion of said housing and having a plurality of concave and reflecting surfaces formed in an upper portion thereof such that adjacent concave and reflecting surfaces define a cusp therebetween; a layer of silver applied to said concave and reflecting surfaces; a tube disposed above and extending along said cusp for accommodating a heat conducting medium therein; and, support means attached to the plate at the cusp to support said tube on said plate, whereby, light shining on said concave and reflecting surfaces is reflected onto said tube in order to heat said heat conducting medium.

8. A solar collector according to claim 7 further comprising a cover engaged on a top portion of said housing and arranged such that a space is defined between said plate and said cover which space comprises a vacuum space.

9. A solar collector according to claim 8, wherein said housing further comprises a mesh grid disposed between said tubes and said cover for supporting said cover.

10. A solar collector according to claim 8, wherein said housing defines at least one opening formed therein for drawing a vacuum in said space.

11. A solar collector according to claim 7, further comprising a chrome coating applied to an outer peripheral surface of each of said tubes for facilitating heat absorption.

* * * * *